July 8, 1924.

W. H. EVERS

WAVE RESISTING STRUCTURE

Filed Jan. 3, 1922   4 Sheets-Sheet 1

1,500,119

INVENTOR:
WILLIAM H. EVERS
BY
ATTORNEY.

July 8, 1924.
W. H. EVERS
WAVE RESISTING STRUCTURE
Filed Jan. 3, 1922 4 Sheets-Sheet 2
1,500,119
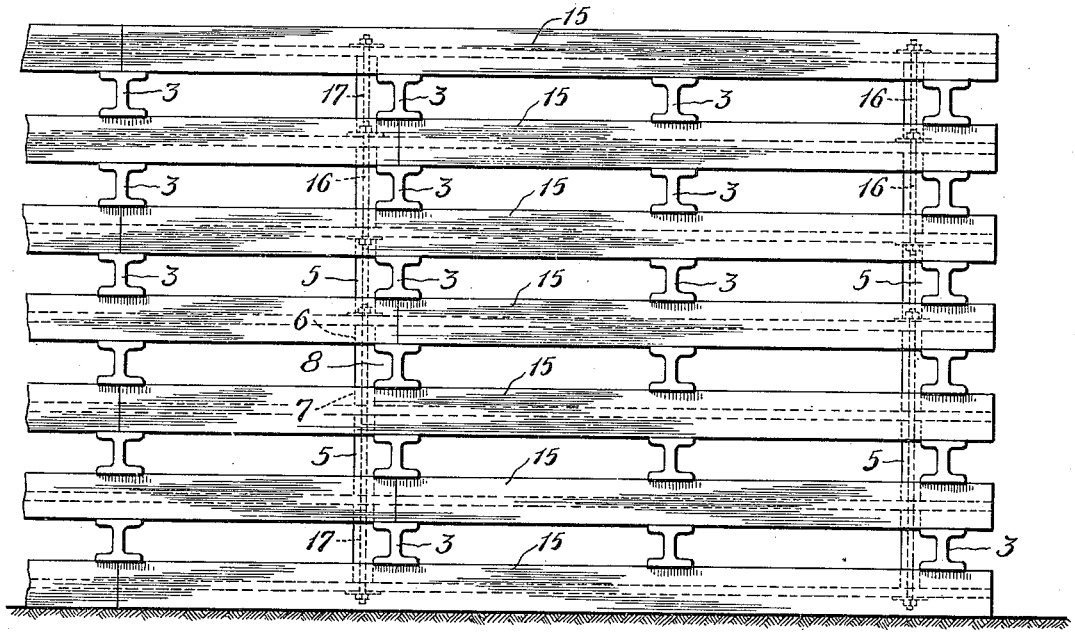
FIG. 3.
FIG. 4.
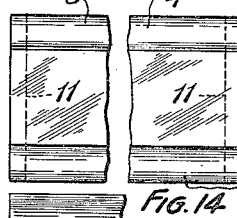
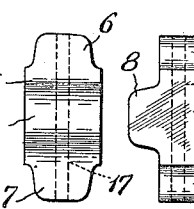
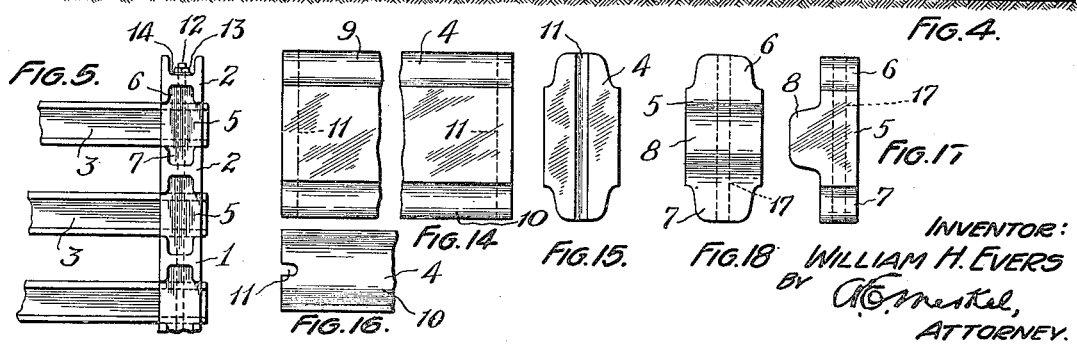
FIG. 5. FIG. 14. FIG. 15. FIG. 16. FIG. 18. FIG. 17.
INVENTOR:
WILLIAM H. EVERS
BY
ATTORNEY.

July 8, 1924.

W. H. EVERS

WAVE RESISTING STRUCTURE

Filed Jan. 3, 1922

INVENTOR:
WILLIAM H. EVERS
BY
ATTORNEY.

July 8, 1924.  
W. H. EVERS  
WAVE RESISTING STRUCTURE  
Filed Jan. 3, 1922     4 Sheets-Sheet 4

1,500,119

INVENTOR:  
WILLIAM H. EVERS  
BY  
ATTORNEY.

Patented July 8, 1924.

1,500,119

UNITED STATES PATENT OFFICE.

WILLIAM H. EVERS, OF LAKEWOOD, OHIO, ASSIGNOR OF ONE-THIRD TO WILLIAM E. PEASE AND ONE-THIRD TO NOAH H. SULOFF, BOTH OF CLEVELAND, OHIO.

WAVE-RESISTING STRUCTURE.

Application filed January 3, 1922. Serial No. 526,549.

*To all whom it may concern:*

Be it known that I, WILLIAM H. EVERS, a citizen of the United States, resident of Lakewood, county of Cuyahoga, and State of Ohio, have invented new and useful Improvements in Wave-Resisting Structures, of which the following is a specification, the principle of the invention being herein explained and the best mode in which I have contemplated applying that principle, so as to distinguish it from other inventions.

This invention relates to wave resisting structures, more particularly to cribwork breakwaters or seawalls, docks, levees, or other partially submerged walls.

An object of the present invention is to utilize a cribwork of crossed beams to reinforce such walls. A further object is to utilize the cribwork of crossed beams to break up the incoming waves before they strike the wall.

In Patent No. 1,340,670 issued May 18, 1920, to W. E. Pease, N. H. Suloff and the applicant, there is disclosed a precast concrete cribbing for retaining walls possessing many practical advantages, such as lightness, strength, economy in manufacture and erection, the ease with which it can be torn down and set up in a new location, etc., as fully set forth in said patent. It is an object of the present invention to extend the use of such precast concrete cribworks to breakwaters, seawalls, docks, levees and other partially submerged structures by making the necessary modifications to meet the different conditions of use while retaining the advantageous features thereof, and by employing certain features of said construction to effect new and highly useful results in such constructions.

Special applications of the principles of the present invention are disclosed in co-pending applications Serial No. 526,548 filed January 3, 1922, and Serial No. 526,550, filed January 7, 1922.

In the annexed drawings and following specification I have set forth in detail certain means embodying my invention, the disclosed means, however, constituting but a few of the various mechanical forms in which the principle of the invention may be employed.

In said annexed drawings:

Fig. 3 is an elevation of the breakwater or seawall from the seaward side.

Fig. 4 is an elevation of the breakwater or seawall from the shore side.

Fig. 5 is a fragmentary end elevation taken as indicated by line V—V in Fig. 4.

Fig. 9 is a rear elevation of the dock before earth is filled in.

Figs. 14 and 15 and 16 are side and end elevations and a fragmentary top plan view, respectively, of the closure block used to fill in the space between the beams of the solid wall.

Figs. 17 and 18 are side and end elevations, respectively, of the pillow blocks used to join the crossing beams.

Figure 1:
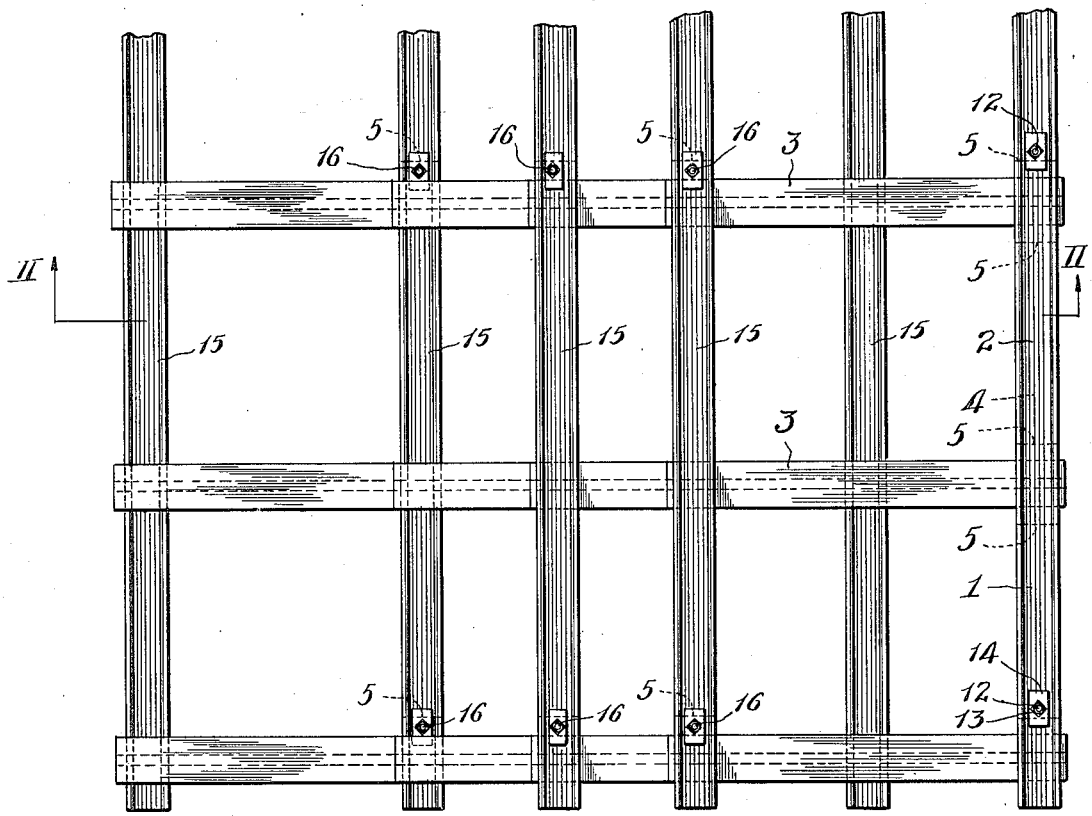
Fig. 1 is a plan view of a portion of the breakwater or seawall construction.

In Figs. 1 to 5 inclusive, is shown a breakwater or seawall structure in which a wave combing structure consisting of a stepped cribwork of crossed beams extends out from a solid wall. The solid wall 1 is formed by a series of vertically spaced reinforced concrete H beams 2 between which the ends of outwardly extending reinforced concrete H beams 3, arranged in vertical courses, are positioned. The beams 3 are arranged with their webs vertical. The spaces between superposed beams 2 intermediate the rear ends of the outwardly extending beams 3 are closed by means of closure blocks 4 and pillow blocks 5. Each pillow block 5 has upper and lower end portions 6 and 7 adapted to fit within the opposed channels of the superposed beams 2 of the wall, a flat inner face and a portion 8 projecting from the outer face thereof adapted to fit in the side channel of an intermediate outwardly extending beam 3. Each closure block 4 has upper and lower portions 9 and 10 adapted to fit within the opposed channels of the superposed beams 2. The ends of the closure blocks 4 are flat and adapted to fit against the inner faces of the pillow blocks 5. Each of the beams 2 is provided with apertures which are vertically alined and pass through the center of the webs thereof. These apertures are placed so that they are in vertical alinement with the grooves 11 formed in the ends of closure blocks 4, which grooves register with each other. Tie bolts 12 extend through the apertures in the webs and through these grooves as shown in Fig. 3. The ends of the tie bolts 12 are threaded to receive nuts 13 which are screwed down upon washer plates 14. The apertures formed in the beams 2 and by the grooves 11 are somewhat larger than the tie bolts 12, so that concrete may be poured into the passage surrounding the bolt 12 to completely embed same as will be understood. The beams 2 are arranged end to end with the abutting ends between the beams 3 in the outwardly extending courses. The beams 2 are arranged in staggered relation so that alternate joints of the superposed beams are positioned between beams in different outwardly extending courses.

Figure 2:
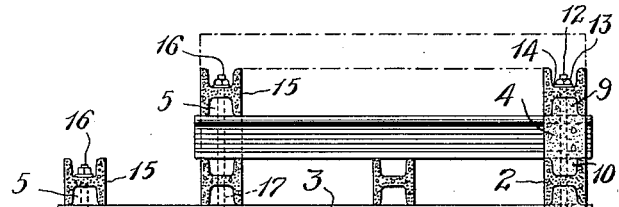
Fig. 2 is a sectional view taken on the plane indicated by line II—II in Fig. 1.
Figure 2:
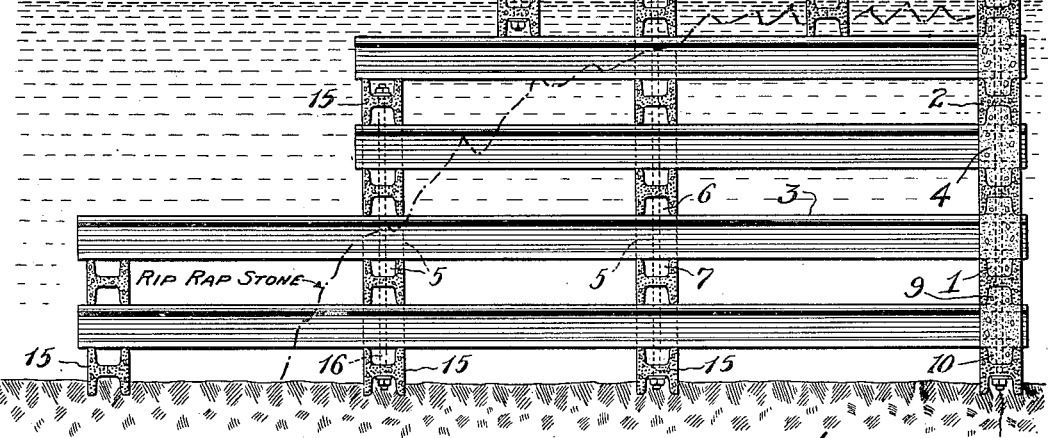
Figure 6:
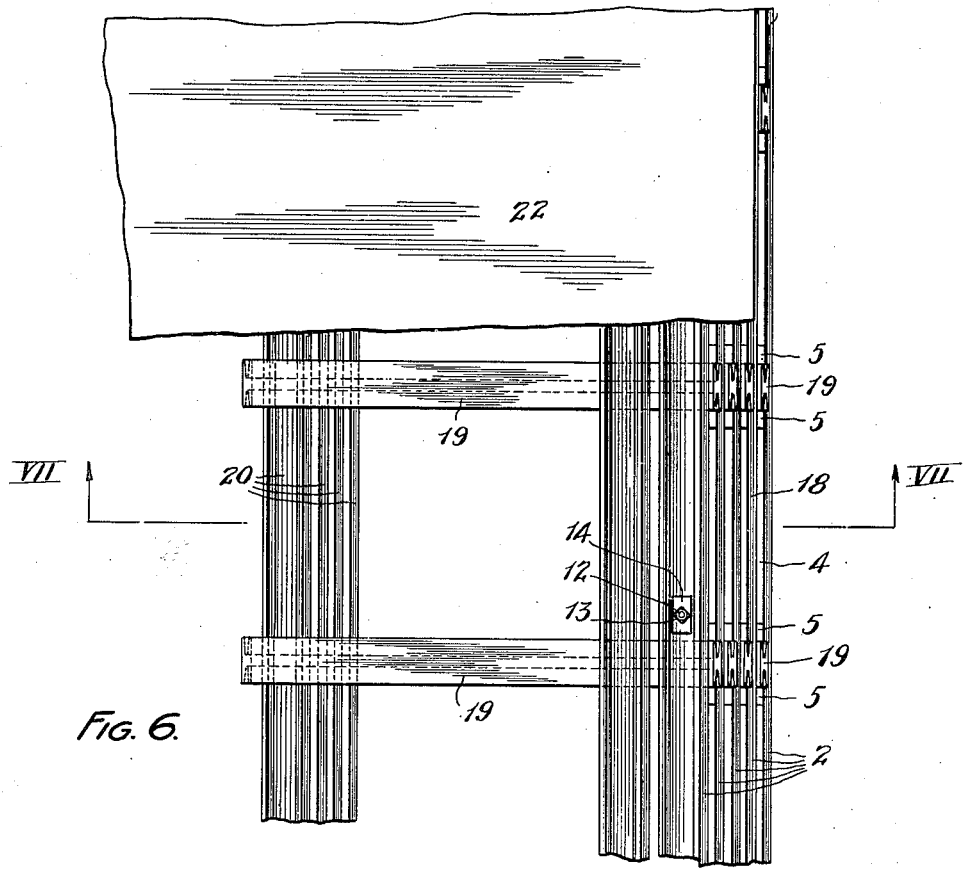
Fig. 6 is a plan view of a dock structure with a portion of the platform broken away.
Figure 7:
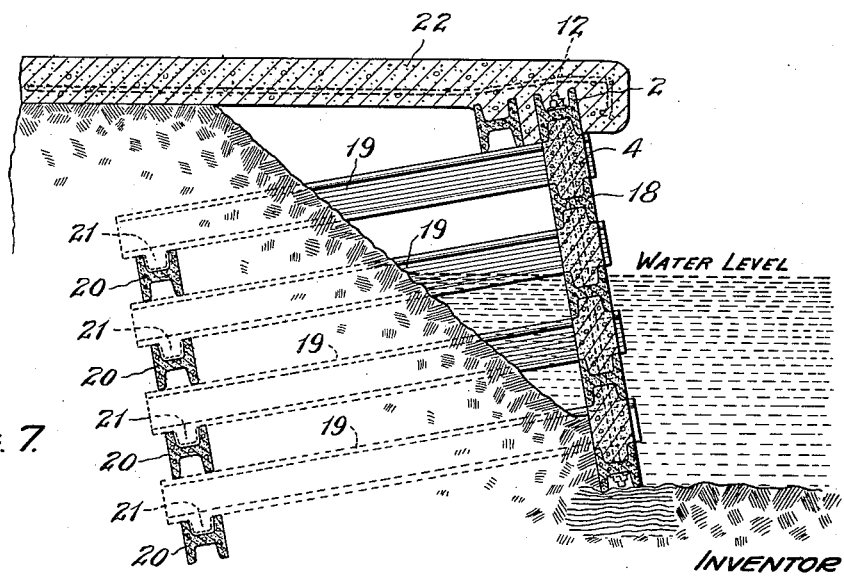
Fig. 7 is a sectional view taken on the plane indicated by line VII—VII in Fig. 6.
Figure 8:
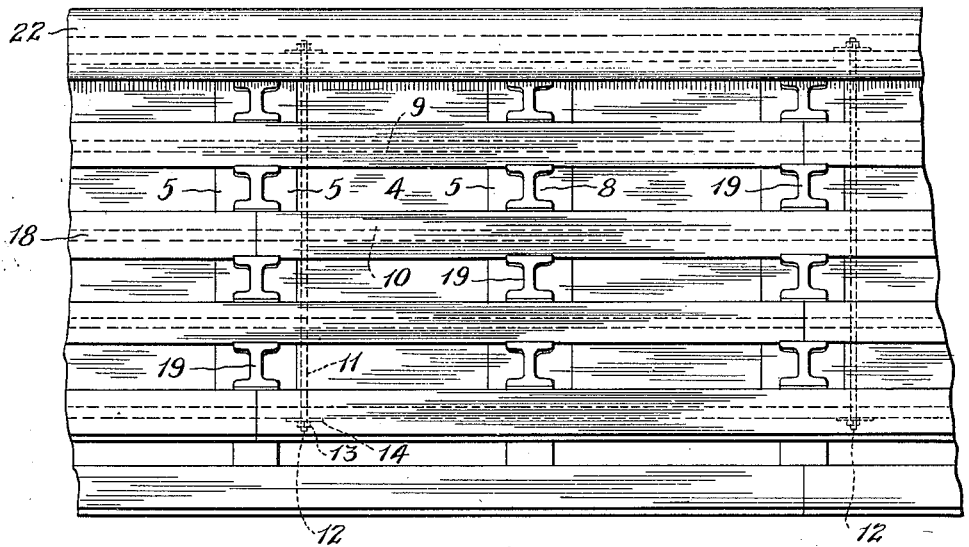
Fig. 8 is a front elevation of the dock.
Figure 9:
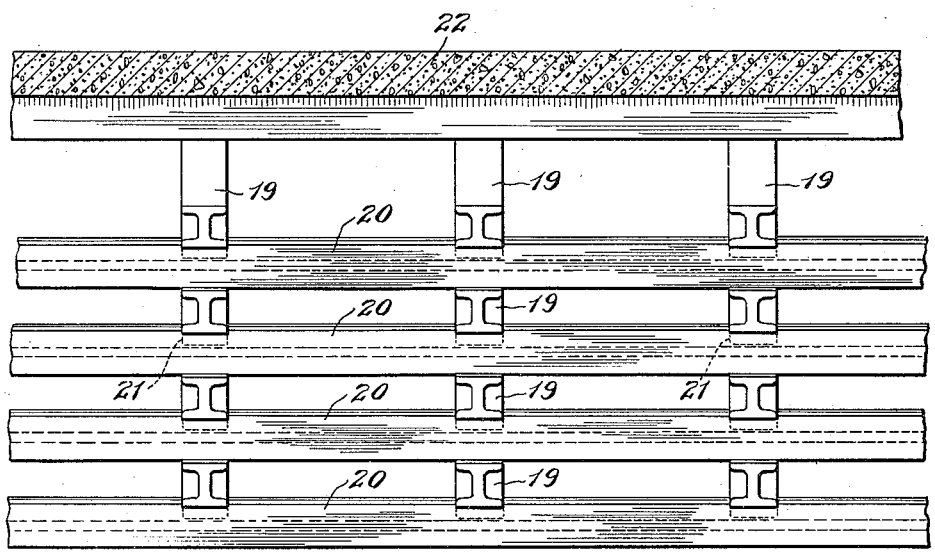
Figures 10, 11, 12, 13:
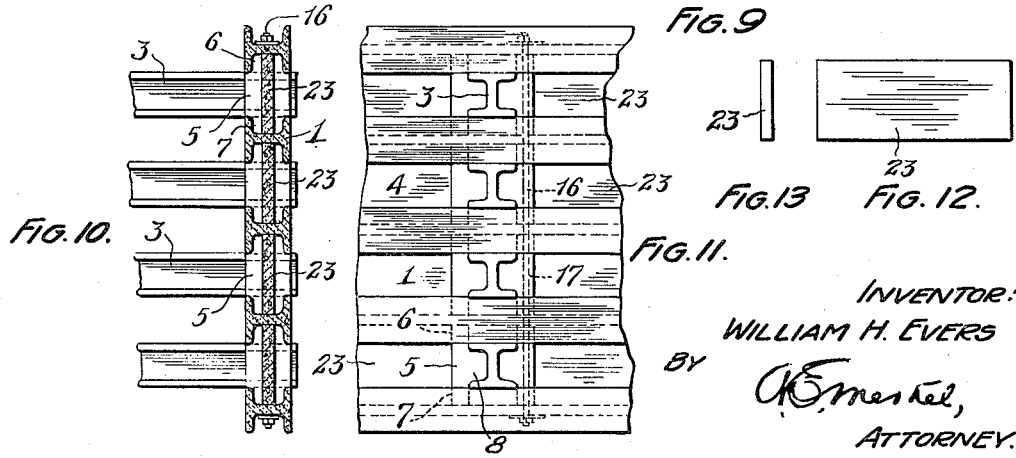
Figs. 10 and 11 are a cross sectional view and front elevation, respectively, of a fragmentary portion of a modified wall construction.
Figs. 12 and 13 show, in side and end elevation, respectively, the closure slab employed in the modified wall construction shown in Figs. 10 and 11.

The outwardly extending beams 3 are of different lengths, those at the bottom of the structure being longest, the beams becoming progressively shorter toward the top. Vertical courses of beams 15 parallel with the wall beams 2 alternate with the outwardly extending beams 3 to form an open cribwork outside the wall. The beams 15 are also arranged with their webs horizontal. Courses of longitudinal beams 15 are arranged at the ends of each of the beams 3 whereby the outer face of the cribwork structure is stepped. The vertical courses of beams 15 are tied together adjacent vertical courses of beams 3 by means of tie bolts 16, which pass through the horizontal webs of superposed beams. In order that the tie bolts 16 may be completely embedded in concrete, pillow blocks 5 having apertures 17 adapted to receive the tie bolts 16 are positioned with the side portions 8 thereof in engagement with the channels of the beams 3. The tie bolts 16 pass through the webs of the beams 15 and the apertures 17 in the pillow blocks 5 and are embedded in concrete in the same manner as the tie bolts 12 in the wall. The cribwork may be filled in with rip rap stone, sacked cement or other heavy material as indicated in Fig. 2, care being taken not to pile the material to such a height as to interfere with the wave combing action of the cribwork.

Referring to Figs. 6 to 9 inclusive, the wall 18 is constructed in exactly the same manner as the wall 1 in the breakwater construction. The wall 18, however, is inclined slightly from the vertical and the rearwardly extending courses of beams 19 extend from the wall 18 rearwardly and downwardly into the embankment at the rear of the wall. Positioned between the beams 19 at the rear ends thereof are beams 20 arranged with their flanges horizontal and extending parallel with the wall 18. Integral lugs 21 on the under face of the beams 19 at the rear end fit within the upper channels of the beams 20. A platform 22 is supported along its outer edge by the wall 18. The wall 18 is effectively braced by the rearwardly extending cribwork.

In Figs. 10 to 13 inclusive, is shown a modified form of wall construction in which relatively thin flat slabs 23 replace the closure blocks 4. The flat slabs 23 can be advantageously used when earth is filled in against the rear face of the wall.

What I claim is:

1. A crib consisting of crossed courses of concrete H beams, the beams of one of said courses being arranged with the webs thereof substantially horizontal, the beams of an intersecting course being arranged with the webs thereof substantially vertical, said horizontal web beams and vertical web beams alternating at the intersection of said courses; pillow blocks between adjacent horizontal web beams, said pillow blocks each having end portions fitting within opposed channels of said horizontal web beams and an intermediate portion fitting within a channel of the intermediate vertical web beam; and tie bolts passing through the horizontal webs and pillow blocks.

2. A crib consisting of concrete H beams arranged in substantially vertically disposed crossing courses, the beams in one of said courses being arranged with the webs thereof substantially horizontal; the beams of crossing courses being arranged with the webs substantially vertical, and substantially vertical web beams alternating with the horizontal web beams; closure members between the successive horizontal web beams intermediate the crossing intermediate beams, said closure members each having grooved ends; pillow blocks fitting against the ends of said closure members and having a portion adapted to fit within the side channels of the vertical web beams whereby a solid wall is formed, and tie bolts received within the end grooves of the closure members and passing through the horizontal webs of the superposed beams.

3. A crib comprising crossed courses of H-beams, the beams of one of said courses being arranged with the webs thereof substantially horizontal, the beams of an intersecting course being arranged with the webs thereof substantially vertical, said horizontal web beams and vertical web beams alternating at the intersection of said courses, pillow blocks between adjacent horizontal web beams, said pillow blocks adapted to fit within opposed channels of said horizontal web beams and also within a channel of the intermediate intersection vertical web beam, and means passing substantially from top to bottom of the crib and acting to tie said several horizontal web beams and pillow blocks together.

Signed by me this 12th day of December, 1921.

WILLIAM H. EVERS.